(12) United States Patent
O'Donnell et al.

(10) Patent No.: US 9,483,781 B2
(45) Date of Patent: Nov. 1, 2016

(54) AUTOMATICALLY GENERATING A REVIEW RATING THE PERFORMANCE OF A PATTERN BASED ON PATTERN DEPLOYMENT, SERVICE HISTORY AND OPERATION OF PATTERN

(71) Applicant: International Business Machines Corporation, Armonk, NY (US)

(72) Inventors: Mary K. O'Donnell, Morrisville, NC (US); Aaron J. Quirk, Cary, NC (US); Lin Sun, Morrisville, NC (US); Andre Tost, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/684,396

(22) Filed: Apr. 12, 2015

(65) Prior Publication Data

US 2016/0104218 A1  Apr. 14, 2016

Related U.S. Application Data

(63) Continuation of application No. 14/509,415, filed on Oct. 8, 2014, now Pat. No. 9,235,854.

(51) Int. Cl.
*G06K 19/00* (2006.01)
*G06Q 30/02* (2012.01)
*G06Q 10/06* (2012.01)
*H04L 12/24* (2006.01)
*H04L 12/26* (2006.01)

(52) U.S. Cl.
CPC .......... *G06Q 30/0282* (2013.01); *G06Q 10/06* (2013.01); *H04L 41/5009* (2013.01); *H04L 41/5032* (2013.01); *H04L 41/5096* (2013.01); *H04L 43/04* (2013.01)

(58) Field of Classification Search
USPC ........................................................ 235/487
See application file for complete search history.

(56) References Cited

U.S. PATENT DOCUMENTS

| 6,494,376 | B1 | 12/2002 | Davis et al. |
| 8,196,089 | B2 | 6/2012 | Bouchard et al. |
| 2009/0313187 | A1 | 12/2009 | Miller |

OTHER PUBLICATIONS

List of IBM Patents or Patent Applications Treated as Related, Apr. 12, 2015, pp. 1-2.

(Continued)

*Primary Examiner* — Jamara Franklin
(74) *Attorney, Agent, or Firm* — Robert A. Voigt, Jr.; Winstead, P.C.

(57) ABSTRACT

A method, system and computer program product for generating a review rating the performance of a pattern. The deployment of a pattern, the service history of the pattern and the operation of the pattern are monitored and information pertaining to the monitored pattern deployment, the monitored service history and the monitored pattern operation is collected, where a pattern is an abstract model of a topology and application environment that encapsulates installation, configuration and management of middleware and applications. The collected information is analyzed to automatically generate a review that contains a score and a comment rating the performance, such as the success or lack of success, in deploying, servicing and operating the pattern. In this manner, a review of a pattern, including a score and a suggested comment, may be automatically generated without requiring the user, such as a system administrator, to spend time writing the review.

6 Claims, 8 Drawing Sheets

(56) References Cited

OTHER PUBLICATIONS

Mell et al., "The NIST Definition of Cloud Computing," Special Publication 800-145, Sep. 2011, pp. 1-7.
Mark Micallef, "An Automated Software Quality Measurement Tool," http://argouml.tigris.org/docs/mmicallef/ProjectReport.pdf, 2001, pp. 1-147, see, pp. 1-28.
Stephen H. Kan, "Metrics and Models in Software Quality Engineering, 2/E," Sep. 16, 2002, pp. 1-560, see Chapter 4, "Software Quality Metrics Overview," http://www.pearsonhighered.com/assets/hip/us/hip_us_pearsonhighered/samplechapter/0201729156.pdf, pp. 85-126.
Mayo et al., "Static and Dynamic Software Quality Metric Tools," Technical Report TR-90-52, Computer Science, Virginia Polytechnic Institute and State University,1990, http://eprints.cs.vt.edu/archive/00000234/01/TR-90-52.pdf, pp. 1-17.

The virtual system has been deployed

Script package Must Gather Logs on virtual machine Custom_Node. 11395877300373 completed successfully Script package Must Gather Logs on virtual machine JMGR. 11395877300375 completed successfully Script package Must Gather Logs on virtual machine IHS_Only_Node. 11395877300376 completed successfully Script package Must Gather Logs on virtual machine DMGR. 11395877300374 completed successfully Executing script package Must Gather Logs on virtual machine Custom_Node. 11395877300373

Executing script package Must Gather Logs on virtual machine Custom_Node. 11395877300373

Executing script package Must Gather Logs on virtual machine Custom_Node. 11395877300373

Executing script package Must Gather Logs on virtual machine Custom_Node. 11395877300373

Script package maestro on virtual machine IHS_Only_Node. 11395877300376 completed successfully Executing script package maestro on virtual machine IHS_Only_Node. 11395877300376

Script package maestro on virtual machine Custom_Node. 11395877300373 completed successfully Executing script package maestro on virtual machine Custom_Node. 11395877300373

Script package maestro on virtual machine DMGR.11395877300374 completed successfully Executing script package maestro on virtual machine DMGR. 11395877300374

Script package maestro on virtual machine JMGR.11395877300375 completed successfully Executing script package maestro on virtual machine JMGR. 11395877300375

Executing script packages

| 700 |
|---|

| WELCOME | INSTANCES▽ | PATTERNS▽ | CATALOG▽ | REPORTS▽ | CLOUD▽ | SYSTEM▽ |

VIRTUAL SYSTEM INSTANCES

| SEARCH ... | TEST SYSTEM FOR PATCHING DEMO |
|---|---|
| JEFFS VS | CREATED ON: JUN 22, 2012 4:14:49 PM |
| JEFFS SERVER 2 | FROM PATTERN: JOE'S COPY OF WEBSPHERE SINGLE SERVER |
| TEST SYSTEM FOR PATCHING DEMO | USING ENVIRONMENT PROFILE: NONE PROVIDED |
| UTEST DEPLOYED VM | CURRENT STATUS VIRTUAL SYSTEM IS READY |
| UTEST_DOUG_FED | UPDATED ON: JUN 22, 2012 5:23:05 PM |
| UTEST_TOK | ACCESS GRANTED TO: ADMINISTRATOR [OWNER] |
| UTEST_JEFF | ADD MORE ... |
| RHUI | SNAPSHOT: JUN 22, 2012 5:19:09 PM |
| UTEST_JEFF3 | SERVICE SNAPSHOT GENERATED |
|  | [RECREATE FOR UPDATE] [RESTORE] |

HISTORY VIRTUAL SYSTEM IS READY

⊟ SERVICE HISTORY — 701

| USER NAME 702 | DATE AND TIME | STATUS |
|---|---|---|
| ☐ CBADMIN | JUN 22, 2012 5:18:35 PM | ✓ SERVICE APPLIED |
| EMERGENCY FIX RECORD | 8.0.03-WS-WAS-IFPM59935 | |

⊞ VIRTUAL MACHINES   1 TOTAL - 1 STARTED
⊞ COMMENTS   THERE ARE NO NEW COMMENTS

AUTOMATICALLY GENERATING A REVIEW RATING THE PERFORMANCE OF A PATTERN BASED ON PATTERN DEPLOYMENT, SERVICE HISTORY AND OPERATION OF PATTERN

TECHNICAL FIELD

The present invention relates generally to cloud computing, and more particularly to automatically generating a review rating the performance of a pattern based on pattern deployment, service history and operation of the pattern.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines.

An administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on the virtual machines in the physical cloud computing nodes. Such a pattern can be deployed repeatedly thereby avoiding the need to provision these environments individually and manually.

Currently, there exists a review system where users can write a review evaluating the performance of the pattern. Such reviews are useful as they provide information, such as usage of the pattern, that provides insights to others who may be interested in deploying such a pattern. However, such a review system requires the user to spend time in writing the review. Since time is limited, users may not have time to write such a review thereby reducing the number of reviews written for a pattern.

Hence, the current review system for evaluating the performance of a pattern is limiting since it requires users to spend time in writing the reviews.

BRIEF SUMMARY

In one embodiment of the present invention, a method for generating a review rating a performance of a pattern comprises monitoring a deployment of a pattern, where the pattern is a model of a topology and application environment that encapsulates installation, configuration and management of middleware and applications. The method further comprises collecting information pertaining to the pattern deployment based on the monitoring of the pattern deployment. The method additionally comprises monitoring a service history of the pattern. Furthermore, the method comprises collecting information pertaining to the service history of said pattern based on the monitoring of the service history of the pattern. Additionally, the method comprises monitoring an operation of the pattern. In addition, the method comprises collecting information pertaining to the operation of the pattern based on the monitoring of the operation of the pattern. The method further comprises analyzing, by a processor, the information pertaining to the pattern deployment, the service history of the pattern and the operation of the pattern. The method additionally comprises generating a review rating a performance of the pattern based on the analysis, where the review comprises a score and a comment.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 6 illustrates a log containing information pertaining to the history of a pattern deployment, such as the success or unsuccess of executing and completing script packages, in accordance with an embodiment of the present invention;

FIG. 7 illustrates a screenshot of a user interface of a system administrator's computing device indicating the service history of the pattern, which includes a log entry of a service applied to the deployed pattern, in accordance with an embodiment of the present invention.

DETAILED DESCRIPTION

Figure 1:
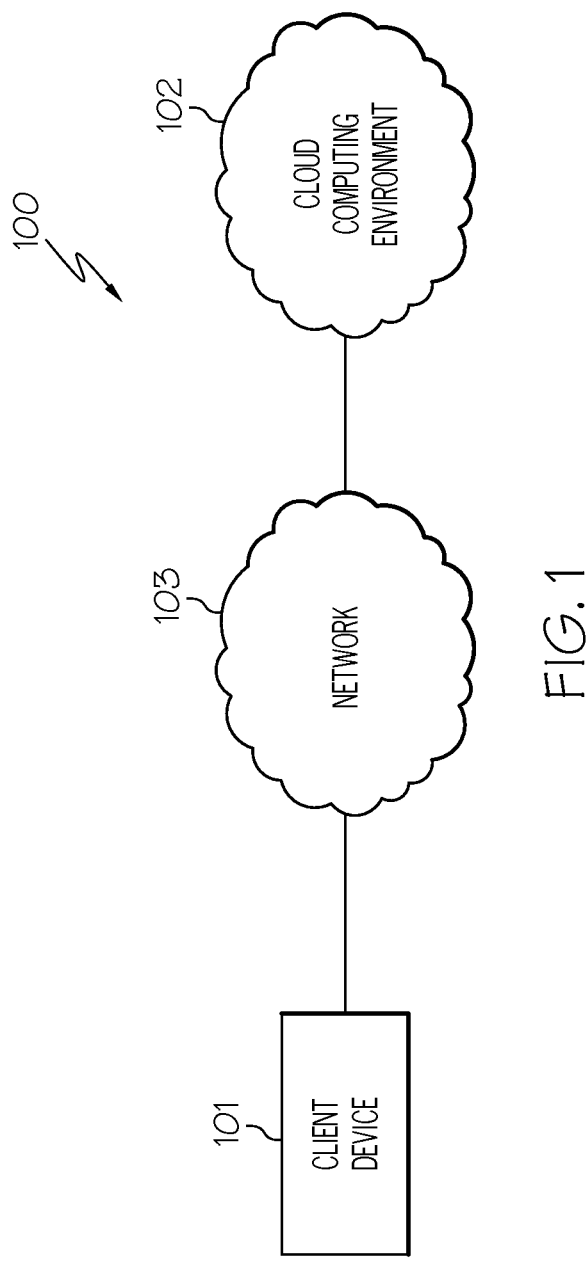
FIG. 1 illustrates a network system configured in accordance with an embodiment of the present invention.

The present invention comprises a method, system and computer program product for generating a review rating the performance of a pattern. In one embodiment, the deployment of a pattern is monitored and information pertaining to the monitored pattern deployment is collected (e.g., length of time for the deployment to occur, the script packages executed during the pattern deployment), where a pattern is an abstract model of a topology and application environment that encapsulates installation, configuration and management of middleware and applications. Furthermore, the service history of the pattern is monitored and information pertaining to the monitored service history is collected (e.g., errors that occurred during the deployment or operation of the pattern, code updates, the duration of any down time during maintenance). Additionally, the operation of the pattern is monitored and information pertaining to the monitored operation is collected (e.g., usage activities, management functions, operation results from executing maintenance fixes). The collected information pertaining to the pattern deployment, the service and the operation of the pattern is analyzed to automatically generate a review that contains a score and a comment rating the performance, such as the success or lack of success, in deploying, servicing and operating the pattern. A review rating the performance in deploying, servicing and operating the pattern is then generated, where the review contains a score and a suggested comment for the particular pattern. In this manner, a review of a pattern, including a score and a suggested comment, may be automatically generated based on pattern deployment, service history and operation of the pattern without requiring the user, such as a system administrator, to spend time writing the review.

While the following discusses the present invention in connection with automatically generating reviews rating the performance in deploying, servicing and operating the pattern, the principles of the present invention may be applied to services running in the cloud, such as IBM's® Bluemix, which is an implementation leveraging Cloud Foundry® to enable developers to rapidly build, deploy and manage their cloud applications. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
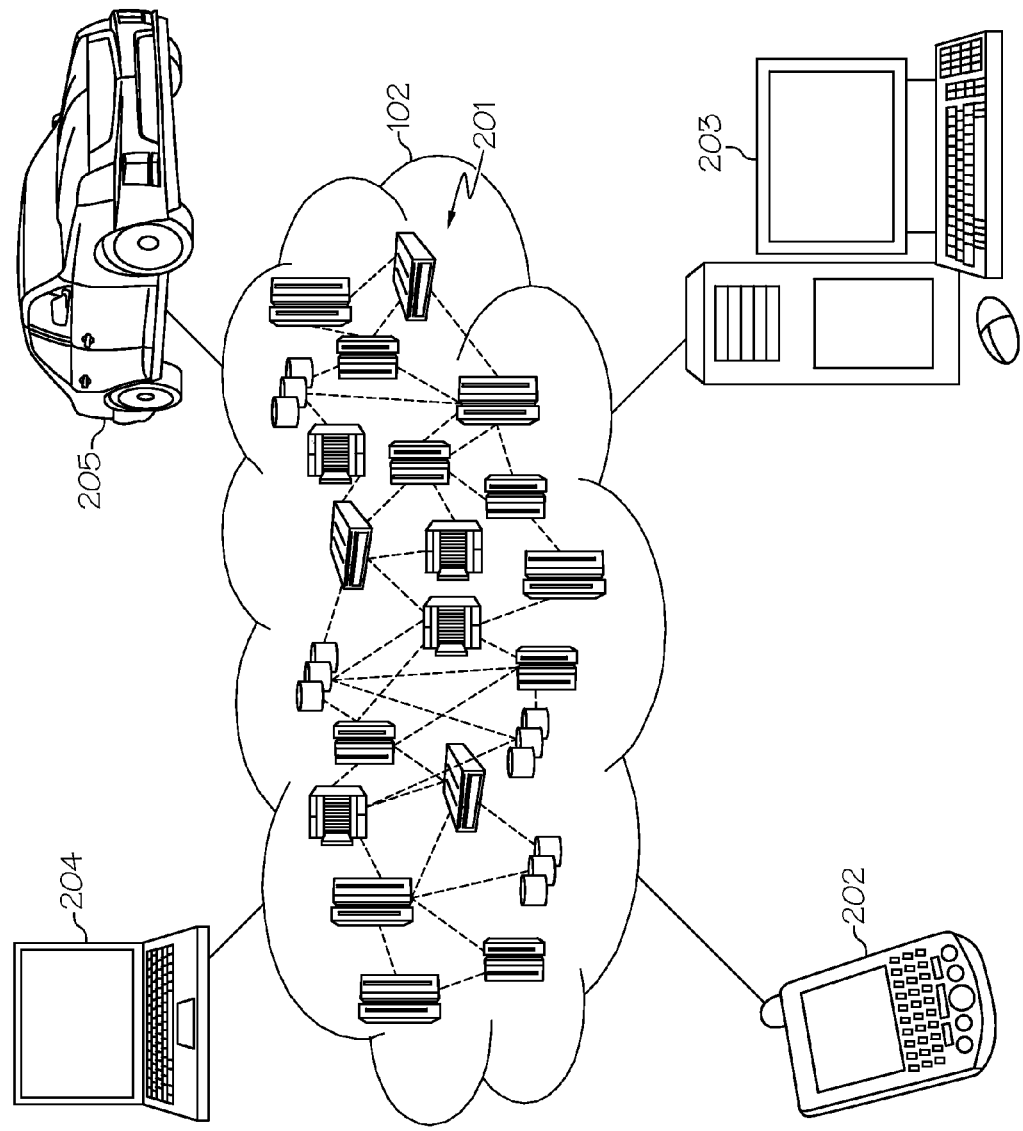
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
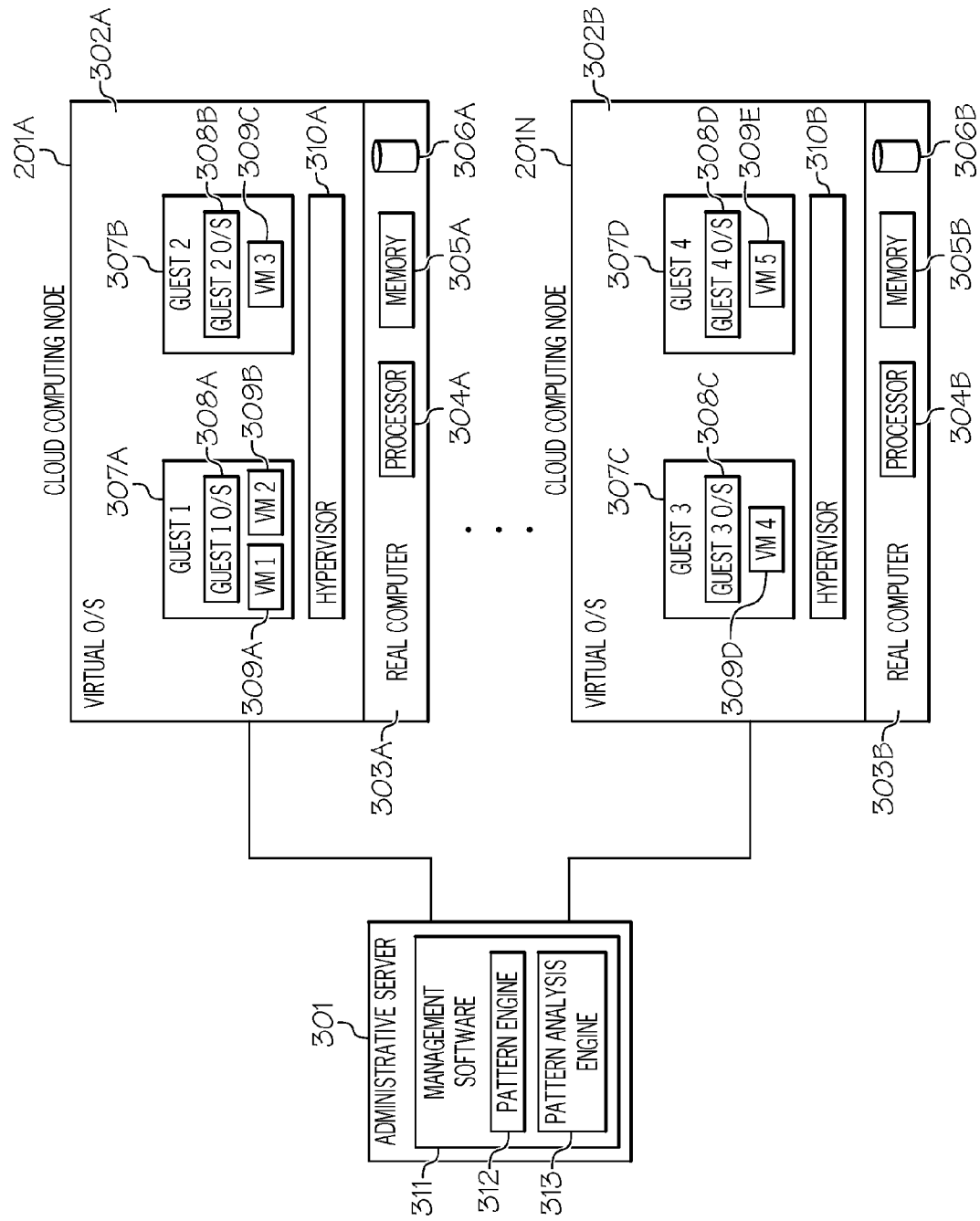
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N, where N is a positive integer number, in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center. A description of the hardware configuration of administrative server 301 is provided further below in connection with FIG. 4.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1" and "Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2," and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor.

Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3" and "Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the management software 311, that can be used to monitor system utilization, intelligently deploy images of data and optimize the operations of cloud computing environment 102.

Management software 311 includes a module referred to herein as the "pattern engine" 312. Pattern engine 312 is configured to build a pattern. A "pattern," as used herein, refers to an abstract model of the topology and application environment that encapsulates the installation, configuration and management of middleware and applications, such as the middleware and applications that run on the virtual machines. Such a pattern can be deployed repeatedly thereby avoiding the need to provision these environments individually and manually. In one embodiment, the pattern includes one or more virtual machine instances.

Management software 311 further includes a module referred to herein as the "pattern analysis engine" 313. Pattern analysis engine 313 is configured to automatically generate a review rating the performance of a pattern based on pattern deployment, service history and operation of the pattern as discussed further below in connection with FIGS. 5-8.

Figure 4:
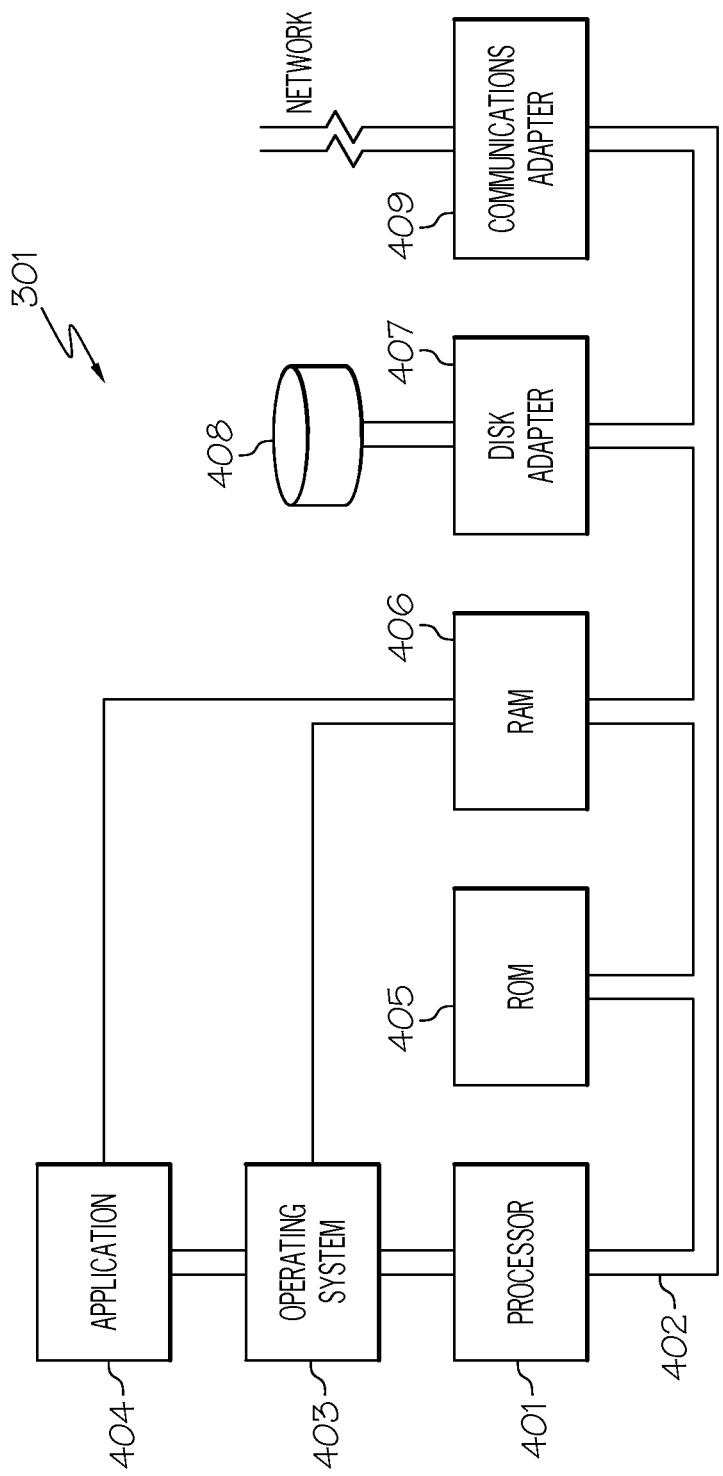
FIG. 4 illustrates a hardware configuration of an administrative server configured in accordance with an embodiment of the present invention.

Referring now to FIG. 4, FIG. 4 illustrates a hardware configuration of administrative server 301 (FIG. 3) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., pattern analysis engine 313 of FIG. 3) for generating a review rating the performance of a pattern based on pattern deployment, service history and operation of the pattern as discussed further below in association with FIGS. 5-8.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for generating a review rating the performance of a pattern based on pattern deployment, service history and operation of the pattern, as discussed further below in association with FIGS. 5-8, may reside in disk unit 408 or in application 404.

Administrative server 301 may further include a communications adapter 409 coupled to bus 402. Communications adapter 409 interconnects bus 402 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, an administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on the virtual machines in the physical cloud computing nodes. Such a pattern can be deployed repeatedly thereby avoiding the need to provision these environments individually and manually. Currently, there exists a review system where users can write a review evaluating the performance of the pattern. Such reviews are useful as they provide information, such as usage of the pattern, that provides insights to others who may be interested in deploying such a pattern. However, such a review system requires the user to spend time in writing the review. Since time is limited, users may not have time to write such a review thereby reducing the number of reviews written for a pattern. Hence, the current review system for evaluating the performance of a pattern is limiting since it requires users to spend time in writing the reviews.

Figure 5:
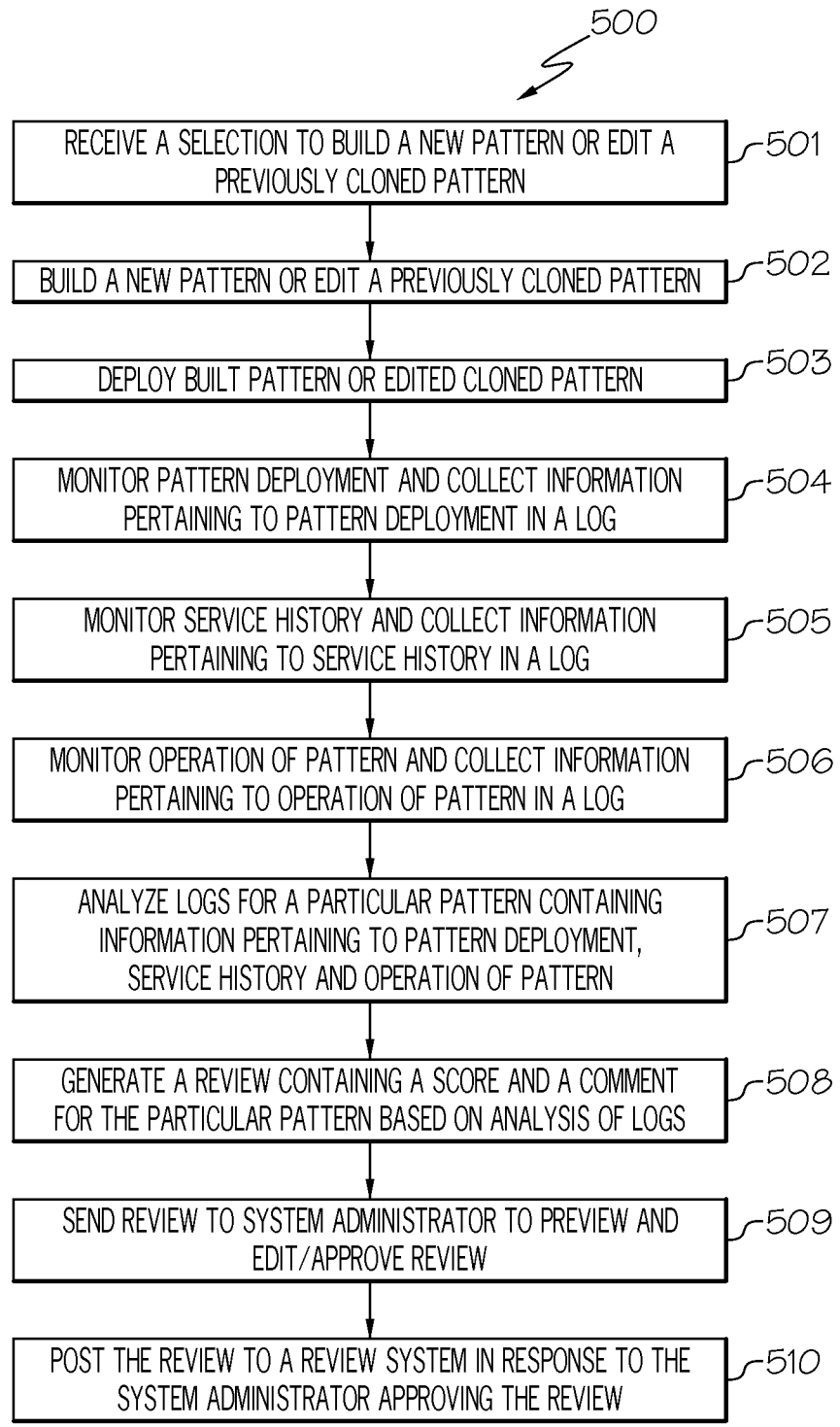
FIG. 5 is a flowchart of a method for generating a review rating the performance of a pattern in accordance with an embodiment of the present invention.
Figure 8:
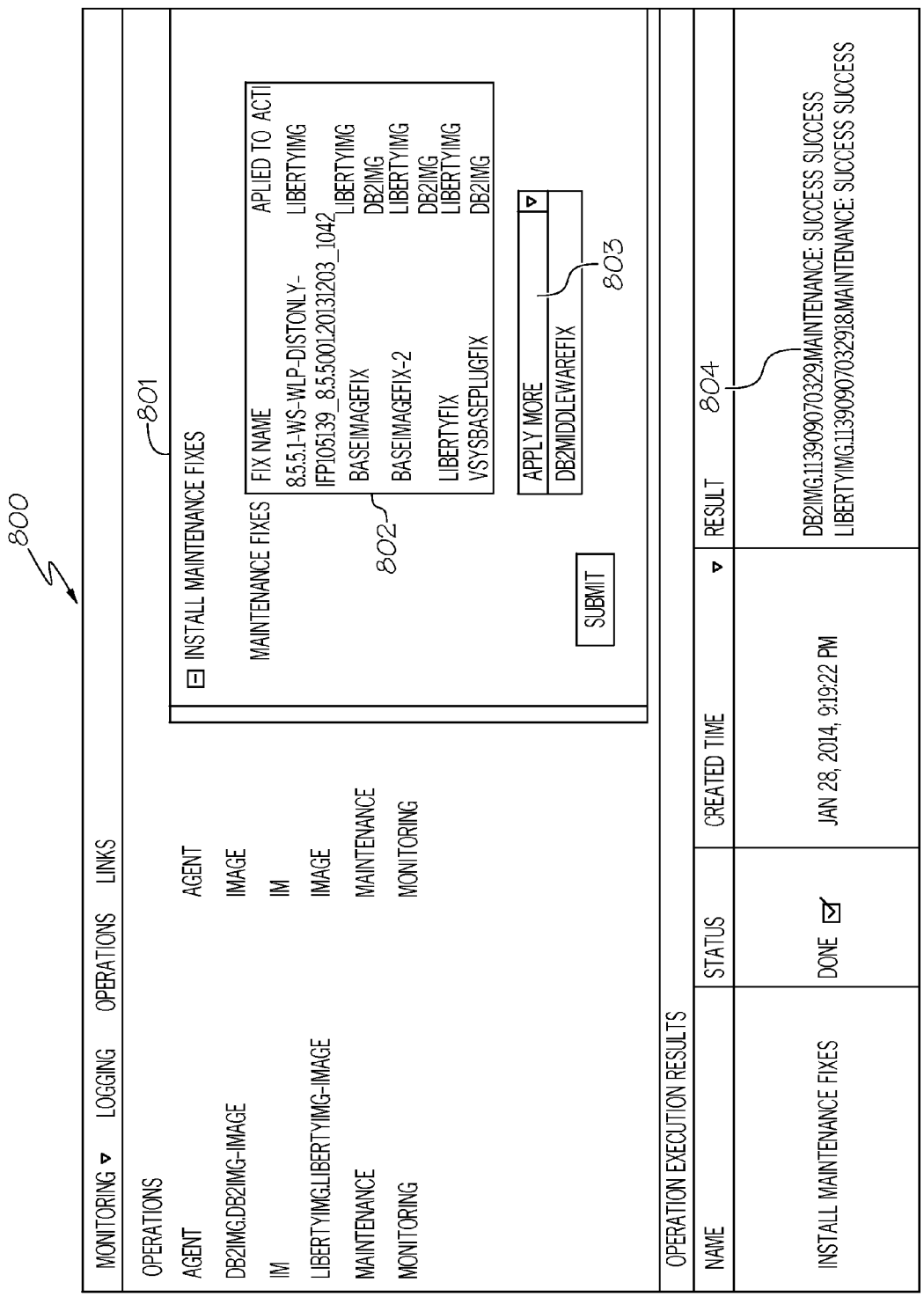
FIG. 8 illustrates a screenshot of a user interface of a system administrator's computing device indicating the operation history of the pattern, including the results of installing a maintenance fix that was selected among a list of maintenance fixes via a pull-down menu in accordance with an embodiment of the present invention.

The principles of the present invention provide a means for automatically generating a review of a pattern based on pattern deployment, service history and operation of the pattern thereby eliminating the requirement for the users to spend time writing the reviews to populate the review system as discussed further below in connection with FIGS. 5-8. FIG. 5 is a flowchart of a method for generating a review rating the performance of a pattern. FIG. 6 illustrates a log containing information pertaining to the history of a pattern deployment, such as the success or unsuccess of executing and completing script packages. FIG. 7 illustrates a screenshot of a user interface of a system administrator's computing device indicating the service history of the pattern, which includes a log entry of a service (e.g., emergency code fix) applied to the deployed pattern. FIG. 8 illustrates a screenshot of a user interface of a system administrator's computing device indicating the operation history of the pattern, including the results of installing a maintenance fix that was selected among a list of maintenance fixes via a pull-down menu.

As stated above, FIG. 5 is a flowchart of a method 500 for generating a review rating the performance of a pattern in accordance with an embodiment of the present invention.

Referring to FIG. 5, in conjunction with FIGS. 1-4, in step 501, pattern engine 312 receives a selection from the user, such as a system administrator, to build a new pattern or edit a previously cloned pattern. A "pattern," as used herein refers to an abstract model of the topology and application environment that encapsulates the installation, configuration and management of middleware and applications, such as the middleware and applications that run on the virtual machines. A "cloned" pattern refers to an identical copy of a preexisting pattern.

In step 502, pattern engine 312 builds a new pattern or edits a previously cloned pattern.

In step 503, pattern engine 312 deploys the built pattern or edited cloned pattern.

In step 504, pattern analysis engine 313 monitors the pattern deployment and collects information pertaining to the monitored pattern deployment, such as in a log, which may be stored in memory or storage on administrative server 301 (e.g., memory 405, disk unit 408). Such activities monitored and collected by pattern analysis engine 313 include the length of time for the deployment to occur, the script packages executed during the pattern deployment, etc. Such information may be collected in a log, such as shown in FIG. 6. FIG. 6 illustrates a log 600 containing information pertaining to the history of a pattern deployment, such as the success or unsuccess of executing and completing script packages in accordance with an embodiment of the present invention.

Referring again to FIG. 5, in conjunction with FIGS. 1-4, in step 505, pattern analysis engine 313 monitors the service history of the pattern and collects information pertaining to the monitored service history, such as in a log, which may be stored in memory or storage on administrative server 301 (e.g., memory 405, disk unit 408). Such activities monitored and collected by pattern analysis engine 313 include errors that occurred during the deployment or operation of the pattern (such as via a call home function which automatically generates notifications of errors), code updates, such as via interim fixes (commonly referred to as "ifixes") or fix packs (contains a cumulative collection of code fixes) that are applied during the deployment or operation of the pattern, the duration of any down time during maintenance, etc. Such information may be collected in a log as illustrated in FIG. 7. FIG. 7 illustrates a screenshot of a user interface 700 of a system administrator's computing device (e.g., client device 101) indicating the service history of the pattern 701, which includes a log entry 702 of a service (e.g., emergency code fix) applied to the deployed pattern in accordance with an embodiment of the present invention.

Returning to FIG. 5, in conjunction with FIGS. 1-4, in step 506, pattern analysis engine 313 monitors the operation of the pattern and collects information pertaining to the monitored operation, such as in a log, which may be stored in memory or storage on administrative server 301 (e.g., memory 405, disk unit 408). Such activities monitored and collected by pattern analysis engine 313 include usage activities (e.g., processing and memory usage in connection with the operation of the pattern, which may be obtained from the user receiving the services provided by the cloud computing environment), management functions, operation results, such as the results from executing ifix operations, maintenance fixes, etc. Such information may be collected in a log as illustrated in FIG. 8. FIG. 8 illustrates a screenshot of a user interface 800 of a system administrator's computing device (e.g., client device 101) indicating the operation history of the pattern, including the results of installing a maintenance fix 801 that was selected among a list of maintenance fixes 802 via a pull-down menu 803 in accordance with an embodiment of the present invention. Such a result is obtained from a log entry 804.

Referring again to FIG. 5, in conjunction with FIGS. 1-4, in step 507, pattern analysis engine 313 analyzes the logs discussed above in steps 504-506 for a particular pattern containing information pertaining to the pattern deployment, service history and operation of the pattern. Such analysis involves analyzing the activities monitored and collected in steps 504-506 to evaluate the performance in deploying, servicing and operating the pattern. Such analysis is used to automatically generate a review that contains a score and a comment rating the performance, such as the success or lack of success, in deploying, servicing and operating the pattern.

In step 508, pattern analysis engine 313 automatically generates a review rating the performance in deploying, servicing and operating the pattern, where the review contains a score and a suggested comment for the particular pattern, based on the analysis of the logs in step 507. For example, a score of 4 (out of a possible 5, with 5 being the highest rating) and a comment of "We have deployed thousands of instances of this pattern with a 98% success rate in completing the deployment within 5 minutes." may be suggested to the system administrator based on the analysis of the logs which indicated a very good performance in the deployment, servicing and operation of the pattern. In another example, a score of 1 (out of a possible 5, with 5 being the highest rating) and a comment of "Pattern always fails to deploy successfully after timing out in 60 minutes." may be suggested to the system administrator based on the analysis of the logs which indicated a very poor performance in the deployment, servicing and operation of the pattern. In this manner, a review of a pattern, including a score and a suggested comment, may be automatically generated based on pattern deployment, service history and operation of the pattern without requiring the user, such as a system administrator, to spend time writing the review. Instead, the system administrator will receive a generated review concerning the performance of the pattern to edit/approve as discussed below thereby reducing the time spent by the system administrator in writing a review to populate the review system.

In one embodiment, the score in the review may be based on a tier of scores that were used in combination to generate the score in the review. For example, separate scores for the deployment, servicing and operation of the pattern may be generated, which are used in combination to generate a total score which is displayed in the review.

In step 509, pattern analysis engine 313 sends the review generated in step 508 to the system administrator (e.g., user of client device 101) to preview and edit/approve the review. For example, if the system administrator would like to change some of the wording in the suggested comment, then the system administrator would be provided an opportunity to modify the wording. The system administrator may then approve the edited review to be posted to the review system. In another example, the system administrator may adjust the score and then approve the edited review to be posted to the review system. In a further example, the system administrator may approve the generated review to be posted to the review system after previewing the generated review and being satisfied with the score and suggested comment. In one embodiment, the system administrator is able to review the tier of scores that were used to generate the score in the review and edit one or more of them which may lead to an adjustment of the score in the review.

In step 510, pattern analysis engine 313 posts the review to a review system in response to the system administrator approving the review. In one embodiment, the approved reviews are posted anonymously to protect the privacy of the system administrator. In one embodiment, users reviewing the reviews in the review system may be able to access the tiers of scores used to generate the score in the review, such as the separate scores for the deployment, servicing and operation of the pattern.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating a review rating a performance of a pattern, the method comprising:
    monitoring a deployment of a pattern, wherein said pattern is a model of a topology and application environment that encapsulates installation, configuration and management of middleware and applications;
    collecting information pertaining to said pattern deployment based on said monitoring of said pattern deployment;
    monitoring a service history of said pattern;
    collecting information pertaining to said service history of said pattern based on said monitoring of said service history of said pattern;
    monitoring an operation of said pattern;
    collecting information pertaining to said operation of said pattern based on said monitoring of said operation of said pattern;
    analyzing, by a processor, said information pertaining to said pattern deployment, said service history of said pattern and said operation of said pattern; and
    generating a review rating a performance of said pattern based on said analysis, wherein said review comprises a score and a comment.

2. The method as recited in claim 1, wherein said information pertaining to said pattern deployment, said service history of said pattern and said operation of said pattern is collected in logs.

3. The method as recited in claim 2 further comprising:
    analyzing said logs containing said information pertaining to said pattern deployment, said service history of said pattern and said operation of said pattern; and
    generating said review comprising said score and said comment for said pattern based on said analysis of said logs.

4. The method as recited in claim 1 further comprising:
    sending said review to a system administrator to be edited or approved.

5. The method as recited in claim 4 further comprising:
    posting said review to a review system in response to said system administrator approving said review.

6. The method as recited in claim 1 further comprising:
    receiving a selection to build a new pattern or edit a previously cloned pattern; and
    building said new pattern or editing said previously cloned pattern;
    wherein said deployed pattern corresponds to said built new pattern or said edited cloned pattern.

* * * * *